United States Patent
Kamizono et al.

(10) Patent No.: US 9,466,436 B2
(45) Date of Patent: Oct. 11, 2016

(54) ALIGNED CARBON NANOTUBE ASSEMBLY, CARBON-BASED ELECTRODE, POWER STORAGE DEVICE, AND METHOD OF MANUFACTURING ALIGNED CARBON NANOTUBE ASSEMBLY

(75) Inventors: Takeshi Kamizono, Nagoya (JP); Gang Xie, Anjo (JP)

(73) Assignee: AISIN SEIKI KABUSHIKI KAISHA, Kariya-shi (JP)

(*) Notice: Subject to any disclaimer, the term of this patent is extended or adjusted under 35 U.S.C. 154(b) by 369 days.

(21) Appl. No.: 14/125,970

(22) PCT Filed: Jun. 14, 2012

(86) PCT No.: PCT/JP2012/003898
§ 371 (c)(1),
(2), (4) Date: Dec. 13, 2013

(87) PCT Pub. No.: WO2012/172809
PCT Pub. Date: Dec. 20, 2012

(65) Prior Publication Data
US 2014/0127586 A1 May 8, 2014

(30) Foreign Application Priority Data
Jun. 17, 2011 (JP) .................................. 2011-135403

(51) Int. Cl.
*H01M 4/58* (2010.01)
*H01G 11/36* (2013.01)
(Continued)

(52) U.S. Cl.
CPC ............... *H01G 11/36* (2013.01); *B82Y 30/00* (2013.01); *B82Y 40/00* (2013.01); *C01B 31/0226* (2013.01);
(Continued)

(58) Field of Classification Search
CPC ...... H01M 4/587; H01M 4/58; H01G 11/06; H01G 11/36; H01G 11/50; B82Y 30/00; B82Y 40/00; C01B 31/0226; C01B 31/0233
See application file for complete search history.

(56) References Cited

U.S. PATENT DOCUMENTS 4,258,110 A * 3/1981 Alvarez ................ H01G 9/025
429/188
2009/0272935 A1* 11/2009 Hata ........................ B01J 20/20
252/70

(Continued)

FOREIGN PATENT DOCUMENTS

JP 9 45312 2/1997
JP 10 125321 5/1998

(Continued)

OTHER PUBLICATIONS

Machine Translation of: JP 2011/068513, Matsumoto et al., Apr. 7, 2011.*

(Continued)

*Primary Examiner* — Kenneth Douyette
(74) *Attorney, Agent, or Firm* — Oblon, McClelland, Maier & Neustadt, L.L.P (57) ABSTRACT

The present invention provides an aligned carbon nanotube assembly constituted of carbon nanotubes each having a defective pore on its side surface, a method of manufacturing the aligned carbon nanotube assembly, a carbon-based electrode, and a power storage device. The aligned carbon nanotube assembly is formed by aggregating a large number of carbon nanotubes aligned in parallel along the same direction and having parallel orientation. In such a state that the aligned carbon nanotube assembly remains grown, the carbon nanotube constituting the aligned carbon nanotube assembly has a defective pore on its side surface. In a raman spectrum of the aligned carbon nanotube assembly in a Raman spectrometric method, when intensity of scattered light in D-band is represented by $I_D$ and intensity of scattered light in G-band is represented by $I_G$, an $I_D/I_G$ ratio is not less than 0.80.

4 Claims, 8 Drawing Sheets (51) Int. Cl.
  *C01B 31/02*    (2006.01)
  *H01G 11/50*    (2013.01)
  *H01B 1/04*     (2006.01)
  *H01M 4/587*    (2010.01)
  *B82Y 30/00*    (2011.01)
  *B82Y 40/00*    (2011.01)
  *H01G 11/06*    (2013.01)
  *B82Y 99/00*    (2011.01)

(52) U.S. Cl.
  CPC ............ *C01B 31/0233* (2013.01); *H01B 1/04* (2013.01); *H01G 11/06* (2013.01); *H01G 11/50* (2013.01); *H01M 4/587* (2013.01); *B82Y 99/00* (2013.01); *C01B 2202/08* (2013.01); *C01P 2002/82* (2013.01); *Y02E 60/13* (2013.01); *Y10T 428/249921* (2015.04)

(56) References Cited

U.S. PATENT DOCUMENTS

2010/0196249 A1    8/2010    Hata et al.
2010/0216023 A1*   8/2010    Wei .................... H01G 9/058
                                                          429/220
2012/0301663 A1    11/2012   Koike et al.

FOREIGN PATENT DOCUMENTS

| | | |
|---|---|---|
| JP | 2001 220674 | 8/2001 |
| JP | 2003 205499 | 7/2003 |
| JP | 2007 076925 | 3/2007 |
| JP | 2007 182352 | 7/2007 |
| JP | 2008 120658 | 5/2008 |
| JP | 2010 241655 | 10/2010 |
| JP | 2011 68513 | 4/2011 |
| JP | 2011 219343 | 11/2011 |

OTHER PUBLICATIONS

International Search Report Issued Aug. 7, 2012 in PCT/JP12/003898 Filed Jun. 14, 2012.

* cited by examiner

Example 1

Comparative example 1

ALIGNED CARBON NANOTUBE ASSEMBLY, CARBON-BASED ELECTRODE, POWER STORAGE DEVICE, AND METHOD OF MANUFACTURING ALIGNED CARBON NANOTUBE ASSEMBLY

TECHNICAL FIELD

This invention relates to an aligned carbon nanotube assembly, in which the directions of a large number of carbon nanotubes are aligned in the same direction, a carbon-based electrode provided with the aligned carbon nanotube assembly, a power storage device, and a method of manufacturing an aligned carbon nanotube assembly.

BACKGROUND ART

A carbon nanotube is a carbon material which is recently attracting attention. Japanese Unexamined Patent Publication (KOKAI) Gazette No. 2001-220674 discloses an aligned carbon nanotube assembly in which chemical vapor deposition (CVD) processing is applied to a substrate in such a state that a temperature of the substrate is kept at 675 to 750° C., whereby a large number of carbon nanotubes are grown on a surface of the substrate to be substantially vertical to the substrate while being arranged in parallel.

Japanese Unexamined Patent Publication (KOKAI) Gazette No. 2007-76925 discloses an aligned carbon nanotube assembly having a carbon nanotube group, constituted of a large number of carbon nanotubes formed by being implanted on a surface of a substrate, and a metal film interconnecting the roots on the substrate side of the nanotubes of the carbon nanotube group. According to the aligned carbon nanotube assembly, the metal film having a melting point higher than a growth temperature of the carbon nanotube is formed, and a catalyst is provided on the metal film. In this state, the carbon nanotubes are grown on the substrate surface by a raw material gas, and metal is then melted at a temperature higher than the growth temperature of the carbon nanotube and thereafter solidified, whereby the root portions of the carbon nanotubes are covered and fixed with the metal. Japanese Unexamined Patent Publication (KOKAI) Gazette No. 2008-120658 discloses an aggregative structure of multiwall carbon nanotubes in which a large number of carbon nanotubes are aggregated in ultrahigh density on a surface of a silicon substrate while vertical alignment is maintained with respect to the surface of the silicon substrate.

Japanese Unexamined Patent Publication (KOKAI) Gazette No. 2007-182352 discloses a technique for manufacturing an aligned carbon nanotube assembly. In this technique, an assembly of grown carbon nanotubes is subjected to a compression process in which the aligned carbon nanotube assembly is exposed to a liquid such as water as compaction secondary processing to be thereafter dried and, thus, to be compressed, whereby the assembly of the carbon nanotubes is densified. This patent literature describes that the aligned carbon nanotube assembly can be densified by being subjected to the compaction secondary processing after the growth of the carbon nanotubes. Further, Japanese Unexamined Patent Publication (KOKAI) Gazette No. 2007-182352 discloses a technique of applying a compression processing as the compaction secondary processing, in which compression is performed by application of a mechanical external pressure, to an aligned carbon nanotube assembly, thereby densifying the aligned carbon nanotube assembly.

Further, Japanese Unexamined Patent Publication (KOKAI) Gazette No. 2003-205499 discloses a technique in which a carbon nanostructure is formed, then, as post-treatment, ultrasonic waves are applied to the carbon nanostructure for approximately 3 to 6 hours in such a state that the carbon nanostructure is dispersed in a solvent in a liquid form, whereby defective pores are actively formed as defects in a six-membered carbon ring array structure (graphene sheet) as a graphite layer of the carbon nanostructure. This document describes that the graphite layer of the carbon nanostructure can be effectively modified by addition of other components.

CITATION LIST

Patent Literature

Patent Literature 1: Japanese Unexamined Patent Publication (KOKAI) Gazette No. 2001-220674
Patent Literature 2: Japanese Unexamined Patent Publication (KOKAI) Gazette No. 2007-76925
Patent Literature 3: Japanese Unexamined Patent Publication (KOKAI) Gazette No. 2008-120658
Patent Literature 4: Japanese Unexamined Patent Publication (KOKAI) Gazette No. 2007-182352
Patent Literature 5: Japanese Unexamined Patent Publication (KOKAI) Gazette No. 2003-205499

SUMMARY OF THE INVENTION

Problem to be Solved by the Invention

Recently, it has been considered that a carbon nanotube is utilized as a carbon-based electrode in a power storage device typified by a capacitor such as a lithium ion capacitor and a battery such as a lithium ion battery. Further, an attempt has been made to apply the carbon nanotubes to further uses.

The present invention has been made in view of the above facts, and it is an object of the present invention to provide an aligned carbon nanotube assembly, which can contribute to further improvement in usage of an aligned carbon nanotube assembly by actively forming a defective fine pore on a side surface of a carbon nanotube constituting an aligned carbon nanotube assembly having a parallel orientation, in which a large number of the carbon nanotubes are aligned in the same direction in a juxtaposed state, a carbon-based electrode, a power storage device, and a method of manufacturing an aligned carbon nanotube assembly.

Means for Solving the Problem (1) In an aligned carbon nanotube assembly according to an aspect 1 of the present invention, a large number of carbon nanotubes aligned in parallel along the same direction and having parallel orientation are aggregated. In such a state that the aligned carbon nanotube assembly remains grown, the carbon nanotube constituting the aligned carbon nanotube assembly has a defective pore on its side surface, and in a raman spectrum in a Raman spectrometric method, when intensity of scattered light in D-band is represented by $I_D$ and intensity of scattered light in G-band is represented by $I_G$, an $I_D/I_G$ ratio is not less than 0.80. The carbon nanotube is a carbon nanostructure in which a graphene sheet formed by carbon-carbon bond has a cylindrical shape. Examples of the carbon nanotube include a single-wall carbon nanotube in which a graphene sheet is a single layer, a multiwall carbon nanotube in which a plurality of graphene sheets are stacked cylindrically and coaxially, and a carbon nanohorn in which a graphene sheet has a conical and cylindrical shape. In the graphene sheet constituting the carbon nanotube, a defective pore is a defect portion where a carbon atom normally existing in the carbon-carbon bond does not exist. The defective pore may penetrate through the graphene sheet in the thickness direction of the graphene sheet, and in the multiwall carbon nanotube, although the carbon atoms are defective, the defective pore may not penetrate. The graphene sheet is a six-membered carbon ring array structure and, in some cases, may be a six-membered carbon ring array structure partially including a five-membered carbon ring array structure or a seven-membered carbon ring array structure. The diameter size and depth of the defective pore are not limited especially.

The ($I_D/I_G$) ratio indicating crystallinity is not less then 0.80 in such a state that the aligned carbon nanotube assembly remains grown (as-grown state, at the time of completion of the growth of the carbon nanotubes), that is, in such a state that post-treatment (for example, ultrasonic irradiation) in which the defective pore is actively formed on the side surface of the carbon nanotube is not executed, and the carbon nanotube is formed of a graphene sheet having low crystallinity. Accordingly, the defective pore as a defect is frequently formed on the side surface of the carbon nanotube. This fact is confirmed from a TEM photograph of FIG. 3.

According to this aspect, if $I_D/I_G$ is less than 0.80, a degree of graphitization in the carbon nanotube is high, and the defective pore as a kind of a defect is infrequently formed on the side surface of the carbon nanotube. The crystallinity of the carbon nanotube is too good, and the number of the defective pores formed on the side surface of the carbon nanotube is too small. Thus, according to this aspect, the $I_D/I_G$ ratio may be made not less than 0.80 or not less than 0.90 and further may be made not less than 1.00 or not less than 1.10. The upper limit is 1.20, for example. If the $I_D/I_G$ ratio is more than 1.20, an excess number of the defective pores are formed on the side surface of the carbon nanotube, and thus the carbon nanotube is violently deteriorated. In a comparative example 1 to be described later, the crystallinity of the carbon nanotube is high, and the $I_D/I_G$ ratio is 0.09. In this case, almost no defective pores as a kind of a defect in the graphene sheet are formed on the side surface of the carbon nanotube. This fact is confirmed from a TEM photograph of FIG. 7. The density of the aligned carbon nanotube assembly is preferably densified to not less than 100 mg/cm³. In this case, since the aligned carbon nanotube assembly is densified, increase of a specific surface area, a current collecting property, and an electroconductivity can be expected. Such an aligned carbon nanotube assembly is suitable for use as a carbon-based electrode (negative electrode or positive electrode) in a power storage device typified by a capacitor such as a lithium ion capacitor and an electric double layer capacitor or a battery such as a lithium ion battery.

(2) A carbon-based electrode according to an aspect 2 of the present invention is constituted of an aligned carbon nanotube assembly in which a large number of carbon tubes aligned in parallel along the same direction and having parallel orientation are aggregated. In such a state that the aligned carbon nanotube assembly remains grown, the carbon nanotube constituting the aligned carbon nanotube assembly has a defective pore on its side surface, and in a raman spectrum of the aligned carbon nanotube assembly in a Raman spectrometric method, when intensity of scattered light in D-band is represented by $I_D$ and intensity of scattered light in G-band is represented by $I_G$, an $I_D/I_G$ ratio is not less than 0.80. The description of the aspect 1 is applied. Further, it is preferable that the density of the aligned carbon nanotube assembly is densified to not less than 100 mg/cm³ and the number of the carbon nanotubes is high.

(3) A power storage device according to an aspect 3 of the present invention is provided with a positive electrode, a negative electrode, an electrolytic substance interposed between the positive electrode and the negative electrode, a separator disposed between the positive electrode and the negative electrode, transporting the electrolytic substance, and suppressing electrical short circuit between the positive electrode and the negative electrode, and a container storing the positive electrode, the negative electrode, the electrolytic substance, and the separator. In this power storage device, at least one of the positive electrode and the negative electrode is provided with an aligned carbon nanotube assembly in which a large number of carbon nanotubes aligned in parallel along the same direction and having parallel orientation are aggregated. In such a state that the aligned carbon nanotube assembly remains grown, the carbon nanotube constituting the aligned carbon nanotube assembly has a defective pore on its side surface, and in a raman spectrum in a Raman spectrometric method, when intensity of scattered light in D-band is represented by $I_D$ and intensity of scattered light in G-band is represented by $I_G$, an $I_D/I_G$ ratio is not less than 0.80. The $I_D/I_G$ ratio is not less then 0.80 in such a state that the aligned carbon nanotube assembly remains grown (as-grown state, at the time of completion of the growth of the carbon nanotubes), that is, in such a state that post-treatment in which the defective pore is formed on the side surface of the carbon nanotube is not executed, and the defective pore is frequently formed on the side surface of the carbon nanotube. The $I_D/I_G$ ratio may be made not less than 0.85, not less than 0.90, not less than 1.00, or not less than 1.10. The upper limit is 1.20, for example. The density of the aligned carbon nanotube assembly is preferably densified to not less than 100 mg/cm³. In this case, since the aligned carbon nanotube assembly is densified, increase of a specific surface area, a current collecting property, and an electroconductivity can be expected. Examples of the power storage device using such an aligned carbon nanotube assembly include a capacitor such as a lithium ion capacitor and an electric double layer capacitor and a battery such as a lithium ion battery. A power storage device which is a lithium ion capacitor having an electrolytic substance containing Li ions may be adopted. A power storage device which is an electric double layer capacitor having an electrolytic substance containing divalent ions such as Ca ions may be adopted, and the power storage device may be a lithium ion capacitor. Since Ca is divalent alkaline earth metal, an electrical energy can be expected to be increased. In the electrolytic substance containing Ca ions, two electrons per one atom of calcium are basically involved in a reaction. Namely, in a reaction of 1 mol atom of calcium, two mol electrons (quantity of electricity of 2 faradays) take part in the reaction, and the electrical energy that can be extracted from a power storage device such as a capacitor can be expected to be increased. At least one of the negative electrode and the positive electrode is preferably provided with an aligned carbon nanotube assembly characterized in that the density is not less than 100 mg/cm³.

(4) A method of manufacturing an aligned carbon nanotube assembly constituted of a large number of carbon nanotubes according to an aspect 4 of the present invention includes a process of forming a catalyst on a surface of a base substance, a temperature raising process of raising an initial temperature of the base substance to 600 to 650° C., and a carbon nanotube formation process of introducing, after the temperature raising process, a carbon raw material gas onto a surface of the base substance to make a carbon nanotube forming reaction occur by chemical vapor deposition treatment (CVD treatment) and thus to form the aligned carbon nanotube assembly on the surface of the base substance, and these processes are performed in sequence. In the carbon nanotube forming process, in such a state that a gas introducing member provided with a large number of the gas introduction holes faces the surface of the base substance, while the temperature of the base substance is kept within a range of 600 to 650° C., the carbon raw material gas from a large number of the gas introduction holes is impinged on the surface from a direction intersecting with the surface having the catalyst of the base substance, and making turbulence of the carbon raw material gas near the surface is promoted. Meanwhile, a large number of carbon nanotubes are aligned in parallel along the same direction while being provided upright on the surface of the base substance, have parallel orientation, and have a defective pores on a side surface. In addition, in a raman spectrum in a Raman spectrometric method, when intensity of scattered light in D-band is represented by $I_D$ and intensity of scattered light in G-band is represented by $I_G$, an $I_D/I_G$ ratio is not less than 0.80 (in such a state that an aligned carbon nanotube assembly remains grown without such a post-treatment as irradiation with ultrasonic waves).

According to this aspect, the $I_D/I_G$ ratio is not less then 0.80 in such a state that the aligned carbon nanotube assembly remains grown (as-grown state, at the time of completion of the growth of the carbon nanotubes), that is, in such a state that post-treatment in which the defective pore is formed on the side surface of the carbon nanotube is not executed, and the defective pore is frequently formed on the side surface of the carbon nanotube. The $I_D/I_G$ ratio may be made not less than 0.85, not less than 0.90, not less than 1.00, or not less than 1.10.

If the $I_D/I_G$ ratio is less than 0.80, the crystallinity of the carbon nanotube is high, and the defective pore as a kind of a defect is infrequently formed on the side surface of the carbon nanotube. The upper limit of the $I_D/I_G$ ratio may be 1.20, for example. In a comparative example 1 to be described later in which the $I_D/I_G$ ratio is 0.09, the crystallinity of the carbon nanotube is high, and almost no defective pores as a kind of a defect are formed on the side surface of the carbon nanotube. A base layer formed of aluminum or an aluminum alloy is preferably formed on the surface of the base substance before the formation of the catalyst on the surface of the base substance. In this case, it is advantageous to obtain a large number of carbon nanotubes oriented in parallel along the same direction and having parallel orientation.

Effect of the Invention

The aligned carbon nanotube assembly according to the aspect 1 of the present invention is formed by aggregating a large number of carbon nanotubes aligned in parallel along the same direction and having parallel orientation. Thus, the present invention can contribute to densification of the carbon nanotubes in the aligned carbon nanotube assembly and can contribute to densification of a density of the number of the carbon nanotubes. According to the aligned carbon nanotube assembly according to the present invention, a defective pore is frequently formed on a side surface of a carbon nanotube. In this case, it can be expected that ions or the like are introduced into a carbon nanotube through the defective pore.

The aligned carbon nanotube assembly according to the present invention can be utilized in a carbon material used as an electrode of a power storage device typified by, for example, a capacitor such as an electric double layer capacitor and a lithium ion capacitor and a battery such as a lithium ion battery.

The carbon-based electrode according to the aspect 2 of the present invention is constituted of the aligned carbon nanotube assembly according to the aspect 1. Accordingly, the carbon-based electrode is formed by aggregating a large number of carbon nanotubes aligned in parallel along the same direction and having parallel orientation. Thus, the present invention can contribute to densification of the carbon nanotubes in the aligned carbon nanotube assembly and can contribute to densification of a density of the number of the carbon nanotubes. According to the carbon-based electrode according to the present invention, since the defective pore is frequently formed on the side surface of the carbon nanotube, it can be expected that ions or the like are introduced into a carbon nanotube through the defective pore. The carbon-based electrode according to the present invention can be utilized in a carbon material used as an electrode of a power storage device typified by, for example, a capacitor such as an electric double layer capacitor and a lithium ion capacitor and a battery such as a lithium ion battery.

At least one of the negative electrode and the positive electrode of the power storage device according to the aspect 3 is provided with the aligned carbon nanotube assembly according to the aspect 1. Thus, the present invention can contribute to densification of the carbon nanotubes in the aligned carbon nanotube assembly and can contribute to densification of a density of the number of the carbon nanotubes. Furthermore, since the defective pore is frequently formed on the side surface of the carbon nanotube, it can be expected that ions or the like are introduced into a carbon nanotube through the defective pore. According to the method of manufacturing an aligned carbon nanotube assembly according to the aspect 4 of the present invention, the aligned carbon nanotube assembly according to the aspect 1 having the above various advantages can be manufactured well.

DETAILED DESCRIPTION OF PREFERRED EMBODIMENTS

An aligned carbon nanotube assembly may be used with a base substance on which the aligned carbon nanotube assembly has been grown or may be used in such a state that the aligned carbon nanotube assembly is separated from the base substance on which the aligned carbon nanotube assembly has been grown.

A carbon nanotube (CNT) in the present invention may be a multiwall carbon nanotube, a single-wall carbon nanotube, or a carbon nanohorn. Although the length of the carbon nanotube is not limited especially, it is 10 to 2000 micrometers or 10 to 1000 micrometers, for example. The aligned carbon nanotube assembly may have a structure in which a plurality of carbon nanotubes extending in the same direction are arranged in parallel or a structure in which a plurality of carbon nanotube bundles in which a plurality of the carbon nanotubes extending in the same direction are arranged in parallel are arranged in parallel.

Figure 1:
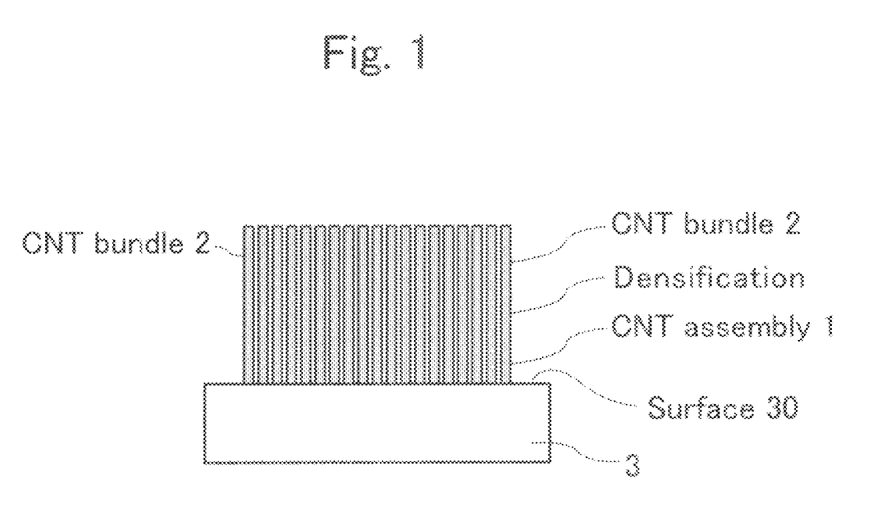
FIG. 1 is a view showing a conception of an aligned carbon nanotube assembly according to an example 1.

As shown in a conceptual diagram of FIG. 1, an aligned carbon nanotube assembly 1 of an aligned carbon nanotube assembly is mounted on a surface 30 of a base substance 3. The aligned carbon nanotube assembly 1 includes the carbon nanotube bundles 2 formed by bundling a large number of arranged carbon nanotubes (CNT) extending along a direction in which the carbon nanotubes are provided upright on the surface 30 of the base substance 3 and having parallel orientation. A large number of the carbon nanotubes 2 are arranged while being aligned vertically to the flat surface 30 of the base substance 3, and the carbon nanotubes 2 are densified, so that the density of the number of the carbon nanotubes is high. As the density of the aligned carbon nanotube assembly 1, the aligned carbon nanotube assembly 1 may be densified to not less than 100 mg/cm$^3$, not less than 200 mg/cm$^3$, not less than 300 mg/cm$^3$, and not less than 400 mg/cm$^3$. The base substance is preferably formed of metal or silicon. Metal constituting the base substance may be at least one kind of titanium, titanium alloys, iron, iron alloys, copper, copper alloys, nickel, nickel alloys, aluminum, aluminum alloys, and silicon. Examples of iron alloys include an iron-chromium-based alloy, an iron-nickel-based alloy, and an iron-chromium-nickel-based alloy. When the base substance is formed of metal, the current collecting property and the electroconductivity can be utilized.

In the manufacturing method, it is preferable that a catalyst exists between the carbon nanotube and the base substance. Transition metals are usually used as the above catalyst. In particular, metals belonging to V to VIII groups are preferred. According to a target value of the density of the aligned carbon nanotube assembly, for example, Iron, nickel, cobalt, molybdenum, copper, chromium, vanadium, nickel vanadium, titanium, platinum, palladium, rhodium, ruthenium, silver, gold, and alloys of them are exemplified. In comparison with the case where the catalyst is a simple substance catalyst, when the catalyst is an alloy, agglomeration of catalyst particles is suppressed at the time of heating in CVD processing, for example, and it is considered that it is effective for miniaturization of a catalyst particle and densification of the aligned carbon nanotube assembly. In order to densify the aligned carbon nanotube assembly, it is preferable that a base layer is formed between the base substance and the catalyst. Accordingly, it is preferable that after the base layer is stacked on the base substance, the catalyst is supported on the base layer. This is because it is considered that the agglomeration of the catalyst particles at the time of heating can be suppressed. The base layer can be formed of a thin film of aluminum or aluminum alloy. The thickness of the base layer may be 5 to 100 nm or 10 to 40 nm. As described above, it is preferable that the catalyst exists between the aligned carbon nanotube assembly and the base substance, and, at the same time, the base layer formed of aluminum or aluminum alloy exists between the catalyst and the base substance.

The catalyst is preferably an A-B based alloy. Preferably, A is at least one metal selected from iron, cobalt, and nickel, and B is at least one metal selected from titanium, vanadium, zirconium, niobium, hafnium, and tantalum. In this case, it is preferable to contain at least one of an iron-titanium-based alloy and an iron-vanadium-based alloy. Further, examples of such an alloy include a cobalt-titanium-based alloy, a cobalt-vanadium-based alloy, a nickel-titanium-based alloy, a nickel-vanadium-based alloy, an iron-zirconium-based alloy, and an iron-niobium-based alloy. In the case of the iron-titanium-based alloy, titanium is not less than 5%, not less than 10%, not less than 20%, not less than 40% (with the remainder being substantially iron), or not more than 50% by a mass ratio, for example. In the case of the iron-vanadium-based alloy, vanadium is not less than 5%, not less than 10%, not less than 20%, not less than 40% (with the remainder being substantially iron), or not more than 50% by the mass ratio, for example. When the catalyst is alloy, in comparison with the catalyst formed of a single metal, the agglomeration of catalyst particles is suppressed at the time of heating, and it is considered that this is advantageous for overcrowding of carbon nanotubes. Examples of the size of the catalyst particle include a range of 2 to 100 nm, a range of 2 to 70 nm, and a range of 2 to 40 nm.

In the carbon nanotube forming reaction, the carbon raw material gas and the process conditions are not especially limited. However, the temperature of the base substance on which the aligned carbon nanotube assembly is formed is preferably within a range of 600 to 650° C. If the temperature of the base substance is less than 600° C., the aligned carbon nanotube assembly is less likely to be formed. If the temperature of the base substance is more than 650° C., the $I_D/I_G$ ratio of the carbon nanotube becomes too law, or the crystallinity of the carbon nanotube becomes too high, and a frequency of forming the defective pore on the side surface of the carbon nanotube is reduced. Examples of the carbon raw material gas as a carbon source supplying carbons forming the carbon nanotube include aliphatic hydrocarbon such as alkane, alkene, and alkyne, an aliphatic compound such as alcohol and ether, and an aromatic compound such as aromatic hydrocarbon. Accordingly, a CVD method (such as CVD, plasma CVD, and remote plasma CVD method) using a hydrocarbon-based carbon raw material gas and an alcohol-based carbon raw material gas is exemplified. Examples of the alcohol-based carbon raw material gas of the aligned carbon nanotube assembly according to the aspect 1 include gases such as methyl alcohol, ethyl alcohol, propanol, butanol, pentanol, and hexanol. Examples of the hydrocarbon-based raw material gas include methane gas, ethane gas, acetylene gas, ethylene gas, and propane gas. In the carbon nanotube forming reaction, the pressure in a reaction container of a CVD device can be made approximately 100 Pa to 0.1 MPa.

Hereinafter, examples of the present invention will be described.

Example 1

(Substrate)

In this example, a stainless steel (SUS304) which was an alloyed steel was used as a substrate functioning as a base substance. Namely, a surface of the substrate whose thickness was 0.5 mm was polished, and a surface roughness Ra of the substrate was 5 nm. The substrate is located in a reaction container of a CVD device.

(Pretreatment, First Layer)

In the pretreatment, a sputtering method was executed in the reaction container, and a base layer (thickness: 7 nm) of an aluminum thin film as a first layer was formed on a surface of the substrate. In this case, an argon gas was used, the pressure in the reaction container was 0.6 Pa, and the temperature of the substrate was within an ordinary temperature range (25° C.). Sputtering was performed in this condition.

(Pretreatment, Second Layer)

As a pretreatment before stacking a second layer on the first layer, the surface of the substrate was subjected to water-repellent treatment. A water repellent treatment liquid with hexamethylorganosilazane incorporated in a solvent (toluene) at a concentration of 5 volume % was used. In this case, the substrate having the base layer was immersed in the water repellent treatment liquid for a predetermined time (30 minutes) in the atmosphere. After that, the substrate was pulled up from the water repellent treatment liquid and naturally dried. Next, the substrate was immersed in a coating liquid for 30 seconds by a dip coater in the atmosphere. The coating liquid was prepared by dispersing iron-titanium alloy particles in a solvent (hexane). The iron-titanium alloy particles had an average particle diameter of 4.0 nm and contained 80% of iron and 20% of titanium by mass ratio. The iron content was higher than the titanium content. When the catalyst is alloy, agglomeration of catalyst particles is suppressed, and it is considered that it is effective for densification of the aligned carbon nanotube assembly. The average particle diameter of the ion-titanium alloy particles was determined based on TEM observation. The average particle diameter was a simple average. The concentration of the coating liquid was prepared by using visible light spectrophotometer (manufactured by WPA: CO7500) in a measurement condition of a wavelength of 680 nm so that the absorbance was 0.3. It is considered that iron-titanium alloy is effective for densification of the carbon nanotubes. After that, the substrate was pulled up from the coating liquid at a rate of 3 mm/min in the atmosphere under room temperature. After that, while the coating liquid was adhered on the surface of the substrate, the substrate was pulled up, and thereafter, hexane was naturally dried. Consequently, an iron-titanium alloy thin film (thickness: 33 nm) as the second layer was formed on the base layer of the substrate. The thickness of the second layer is larger than the thickness of the base layer. After that, the method of carbon nanotube formation was executed.

(Method of Carbon Nanotube Formation)

Figure 4:
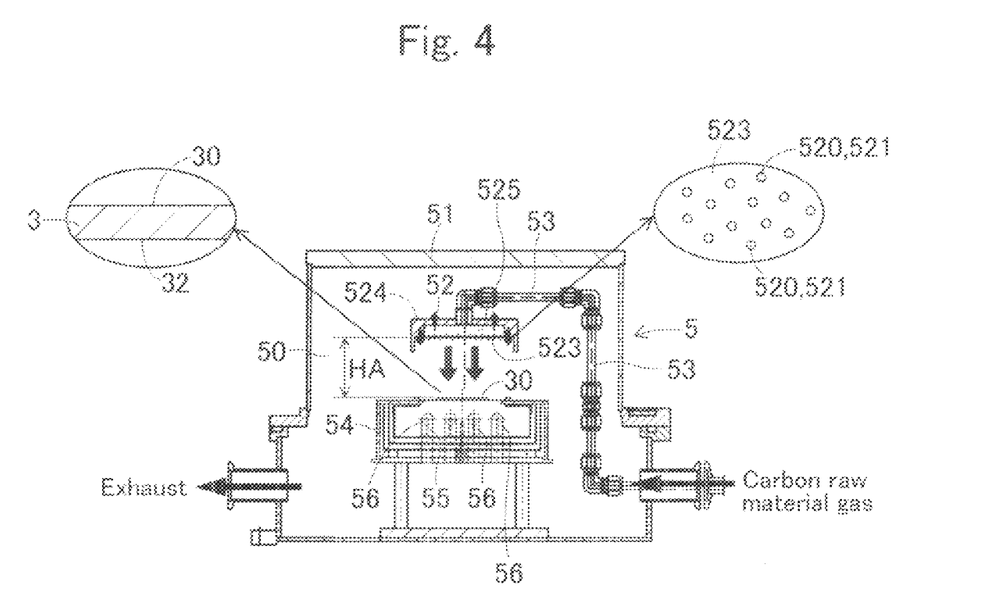
FIG. 4 is a cross-sectional view showing a manufacturing device manufacturing the aligned carbon nanotube assembly according to the example 1.
Figure 5:
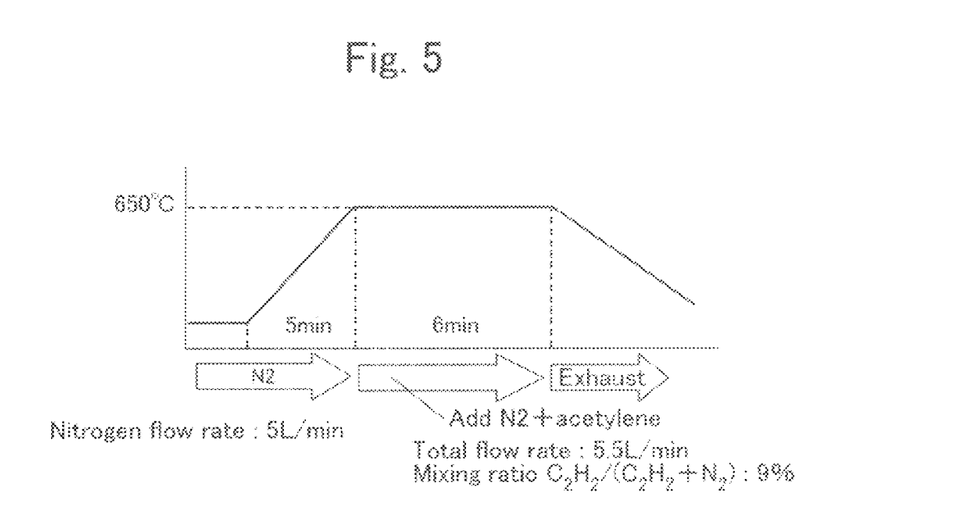
FIG. 5 is a graph showing a process of introduction of a carbon raw material gas used for formation of the aligned carbon nanotube assembly according to the example 1.

The aligned carbon nanotube assembly was formed on the surface of the substrate, using a CVD device 5 shown in FIG. 4. FIG. 5 shows a process of introducing the carbon raw material gas in the formation of the aligned carbon nanotube assembly. In this case, the temperature of a substrate 5 was previously increased from room temperature to a predetermined temperature (650° C.) for 5 minutes prior to the formation of the carbon nanotube. Namely, the reaction container was previously evacuated at a degree of vacuum of 10 Pa, and a nitrogen gas as a carrier gas was introduced into the reaction container at a flow rate of 5000 cc/min. While the pressure in the reaction container was adjusted to $1 \times 10^5$ Pa, the temperature of the substrate was rapidly increased from a room temperature range (initial temperature) to 650° C. for 5 minutes. The rate of temperature increase was 120° C./min. As described above, since the temperature was increased within a short time, the agglomeration of catalyst particles on the substrate is suppressed, and it is possible to contribute to densification of the aligned carbon nanotube assembly and enhance the density of the number of the carbon nanotubes per unit area.

After the substrate temperature was increased as described above, when the substrate temperature was 650° C., a raw material gas ($C_2H_2/C_2H_2+N_2=9\%$ in terms of a molar ratio) containing acetylene ($C_2H_2$) mixed with nitrogen ($N_2$) was supplied into the reaction container, and the CVD treatment was then performed. As described above, carbon nanotubes were formed while the substrate temperature was maintained from the introduction of the raw material gas to termination of the reaction. For the raw material gas, acetylene gas was introduced at a rate of 5500 cc/min for 6 minutes as the CVD treatment time. After that, the gas in the reaction container was discharged. In this way, the aligned carbon nanotube assembly constituted of a large number of carbon nanotubes was formed on the iron-titanium alloy catalyst on the surface of the substrate. Many of the grown carbon nanotubes were multiwall carbon nanotubes. According to the example 1, the grown carbon nanotubes each have a length of 140 to 150 μm, the average diameter of 9.5 nm, and a density of 520 mg/cm$^3$. The density of the number of the carbon nanotubes per unit area was extremely high. The density corresponds to the density in such a state that the aligned carbon nanotube assembly remains grown (at the time of completion of the growth of the aligned carbon nanotube assembly). In order to enhance the density of CNT, a longer CVD treatment time is preferable; however, the crystallinity of CNT is enhanced. Thus, the CVD treatment time is preferable not more than 10 minutes or 8 minutes.

The density was obtained based on a weight difference method using an electronic balance (a weight difference of the substrate before and after the formation of the aligned carbon nanotube assembly). Namely, the weight W [g] of the aligned carbon nanotube assembly itself was measured by weight measurement before and after the formation of the aligned carbon nanotube assembly on the substrate surface. The weight W [g] was divided by an area S of a portion of the substrate on which the aligned carbon nanotube assembly was formed. Consequently, the weight per unit area W/S [g/cm$^2$] of the carbon nanotube was calculated. The cross-sectional surface of the aligned carbon nanotube assembly was observed with a SEM, and a film thickness [μm] of the aligned carbon nanotube assembly was measured. Consequently, the film thickness was considered, and the density [g/cm$^3$] of the aligned carbon nanotube assembly was calculated.

Similarly, in a comparative example 1, an aligned carbon nanotube assembly was formed on a surface of a substrate. The manufacturing method in the comparative example 1 is basically the same as that in the example 1. However, a preheating temperature of the substrate before introduction of a raw material gas into a reaction container and a temperature of the substrate in a carbon nanotube forming process was set to 750° C. According to the comparative example 1, each carbon nanotube had a length of 140 to 150 μm, an average diameter of 6 to 7 nm, and a density of 180 mg/cm$^3$. The density corresponds to the density in such a state that the aligned carbon nanotube assembly remains grown (at the time of completion of the growth of the aligned carbon nanotube assembly).

The description of the CVD device will be added. FIG. 4 shows the CVD device 5. The CVD device 5 has a reaction container 51 having a chamber room 50, a gas introducing portion 52 located in the chamber room 50, a gas piping 53 connected to the gas introducing portion 52, and a holder 54 holding a substrate 3, located in the chamber room 50, along a horizontal direction, and a heater device 55 provided in the holder 54. As shown in FIG. 4, the gas introducing portion 52 has a plate-shaped gas introduction member 523, which is provided with a gas introduction hole group 521, constituted of a large number of small gas introduction holes 520 (inner diameter: 1 mm) facing a surface 30 of the substrate 3 while approaching the surface 30, and disposed in a horizontal direction, and a gas introduction chamber 525 constituted of the gas introduction member 523 and a wall 524. The gas introduction chamber 525 is connected to the gas introduction pipe 53. The heater device 55 is used for promoting thermal decomposition of a carbon raw material gas. A plurality of electric heaters 56 are provided to heat the substrate 3 while facing a back surface 32 of the substrate 3 opposite to the surface 30 on which the aligned carbon nanotube assembly is formed. In order to uniformly heat the substrate 3, the electric heaters 56 are arranged at a distance from each other.

No heater device is disposed on the gas introduction member 523 side. Namely, no heater is provided above the substrate 3. The gas introduction member 523 is disposed parallel to the surface 30 of the substrate 3 and faces the surface 30 of the substrate 3 while approaching the surface 3. Accordingly, regarding all of the gas introduction holes 520, the shortest distance between the surface 30 of the substrate 3 and the gas introduction holes 520 is basically the same. Accordingly, it is possible to contribute to homogenization of the growth of the aligned carbon nanotube assembly. In this case, a shortest distance HA (see, FIG. 4) between the surface 30 of the substrate 3 and the gas introduction holes 520 is 20 to 30 mm (25 mm). A flow of the carbon raw material gas is divided through the many small gas introduction holes 520, and, at the same time, the divided flows are substantially vertically impinged toward the surface 30 of the substrate 3. It is considered that the carbon raw material gas sprayed out through the adjacent gas introduction holes 520 is substantially vertically impinged toward the surface 30 of the substrate 3 and then impinged on each other. Thus, making turbulence of the carbon raw material gas is effectively promoted on the surface 30 of the substrate 3 supporting the catalyst. In addition, the temperature of the substrate 3 is relatively low and 650° C. According to these embodiments, the turbulence of the carbon raw material gas on the surface 30 of the substrate 3 and the relatively low temperature of the surface 30 of the substrate 3 suppress crystallization of the carbon nanotubes in the formation of the aligned carbon nanotube assembly on the surface 30 of the substrate 3, and it is considered that it is effective for enhancing a frequency of formation of the defective pore as a defect on a graphene sheet (six-membered carbon ring array structure) of the side surface of the carbon nanotube.

Figure 2:
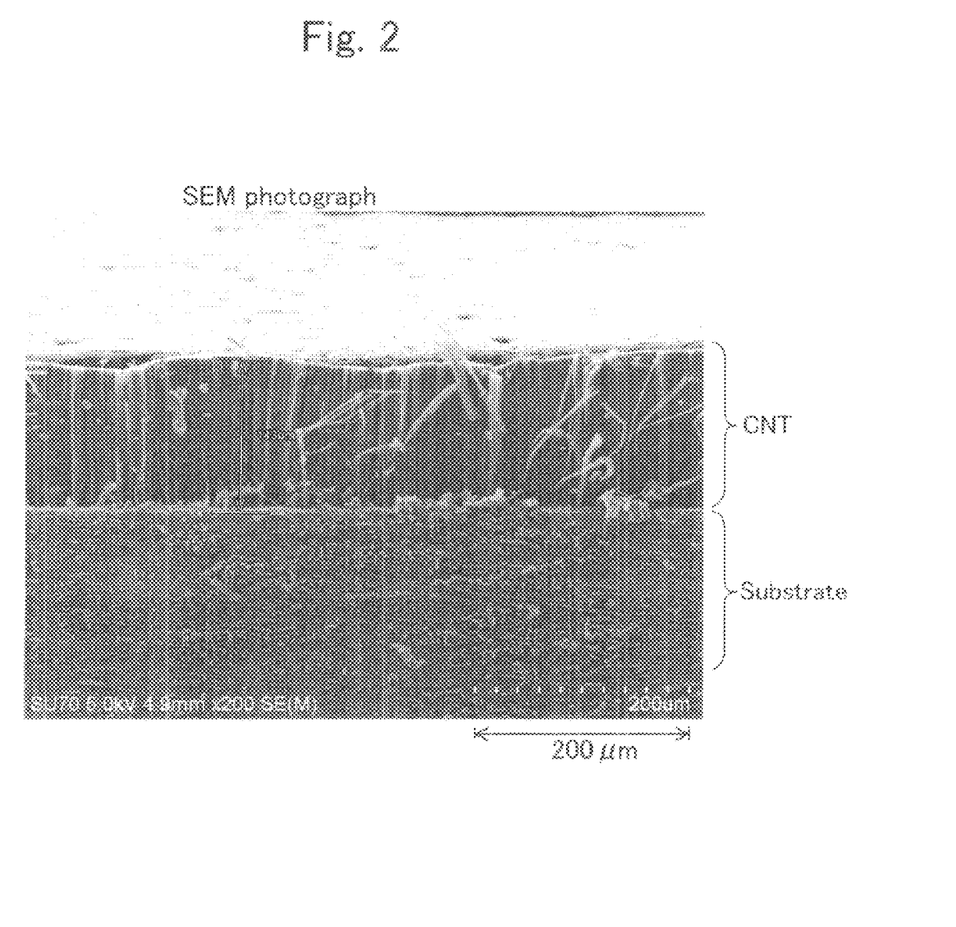
FIG. 2 is a view of a scanning electron microscope (SEM) photograph showing the aligned carbon nanotube assembly according to the example 1.

FIG. 1 schematically shows the aligned carbon nanotube assembly 1 obtained on the surface 30 of the substrate 3. FIG. 2 shows a SEM photograph of a carbon nanotube (CNT) assembly obtained on the surface 30 of the substrate 3. As seen in FIGS. 1 and 2, a large number of carbon nanotube (CNT) bundles 2 are formed in a high density by being implanted on the surface 30 of the substrate 3. In the carbon nanotube bundles 2, a large number of carbon nanotubes extending in the same direction along a direction in which the carbon nanotubes are provided upright on the surface 30 of the substrate 3 and having parallel orientation (perpendicular orientation) are arranged in parallel and aggregated. According to this constitution, the aligned carbon nanotube assembly 1 is formed on the surface 30 of the substrate 3. The carbon nanotube bundles 2 are aligned in a substantially vertical direction from the surface 30 of the substrate 3. The carbon nanotube bundle 2 is referred to as a state of a group in which while a plurality of carbon nanotubes are bundled while being arranged in parallel in a direction perpendicular to the length direction of the carbon nanotube. As seen in FIG. 2 showing SEM observation, a high-density carbon nanotube assembly is formed. The length of the carbon nanotube was about 143 μm (about 140 to 150 μm). The density of the aligned carbon nanotube assembly was 520 mg/cm$^3$, and the density of the number of the carbon nanotubes was extremely high. The density corresponds to the density in such a state that the aligned carbon nanotube assembly remains grown (the density at the time of completion of the growth of the aligned carbon nanotube assembly). In other words, the density is different from that described in Japanese Unexamined Patent Publication (KOKAI) Gazette No. 2007-182352, and this value is a value obtained not through compaction secondary processing such as exposure to water and drying or compaction secondary processing such as compression of the carbon nanotube with an external force.

Figure 3:
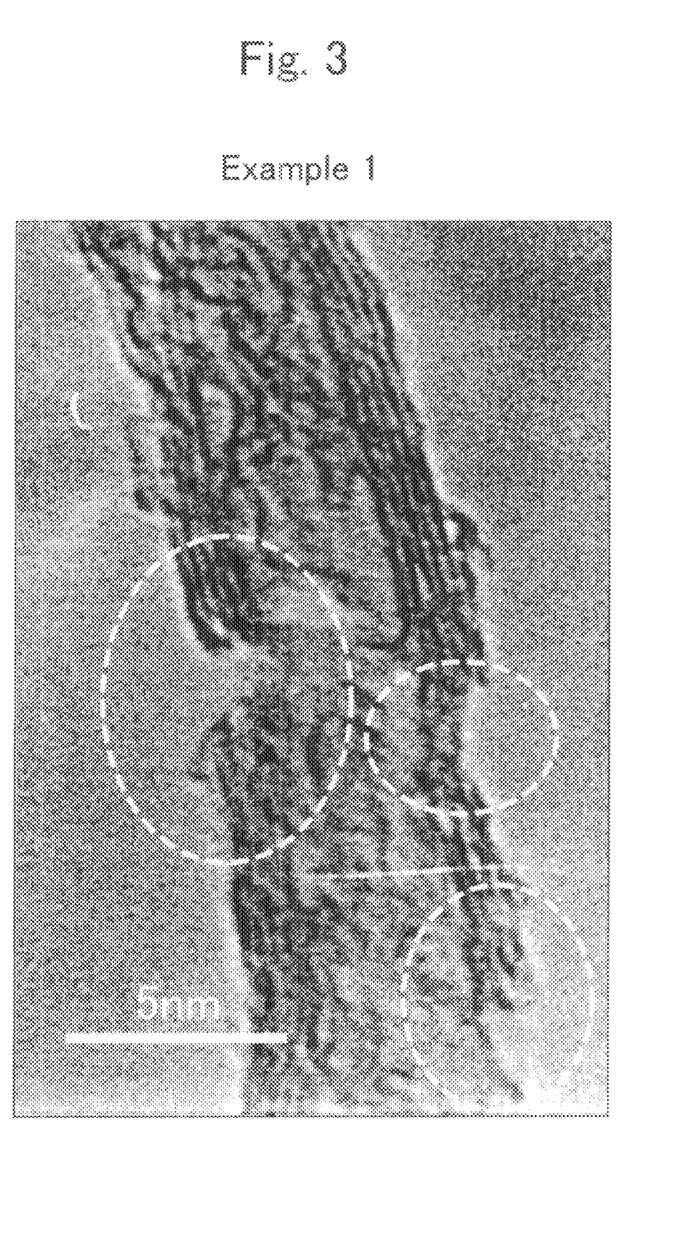
FIG. 3 is a TEM photograph showing a state in which pores are formed on a side surface of a single carbon nanotube according to the example 1.

According to the above example, it is assumed that the aligned carbon nanotube assembly can be densified because the suppression of agglomeration of the catalyst, stabilization of the temperature of the base substance, and the stabilization of the catalyst can be realized. Namely, as described above, since the temperature of the base substance is increased at high speed to a temperature at which the agglomeration of the catalyst is suppressed before the introduction of the raw material gas of the carbon nanotube, it is assumed that the agglomeration of the catalyst on the substrate due to the increasing of the temperature of the substrate is prevented, and variation in the activation level of the catalyst is in turn reduced. According to the TEM observation, each of the carbon nanotubes was a multiwall carbon nanotube in which the carbon nanotubes are stacked substantially coaxially in a multi-layered way. An assembly of the carbon nanotubes in which the thin carbon nanotubes are densely spread had a high density as described above. FIG. 3 shows a TEM photograph obtained by photographing a single carbon nanotube of the aligned carbon nanotube assembly formed in the example 1. As shown in FIG. 3, it is visually confirmed that the carbon nanotube has a multi-layer structure in which a plurality of graphene sheets are coaxially formed into a cylindrical shape, and, in addition, the defective pores are frequently formed on the side surface of the single carbon nanotube. According to FIG. 3, the defective pores facing each other are frequently formed on the side surface of the single carbon nanotube. According to the carbon nanotube formed in this example, there is a region where a plurality of defective pores are formed at facing portions of the side surface of the carbon nanotube so as to face each other. As described above, according to the example 1, in such a state (as-grown state) that the aligned carbon nanotube assembly remains grown, the carbon nanotube constituting the aligned carbon nanotube assembly frequently has the defective pore on its side surface, and the degree of graphitization ($I_D/I_G$) is not less than 0.80. The degree of graphitization ($I_D/I_G$) of the carbon nanotube of the example 1 was specifically 1.03.

Figure 7:
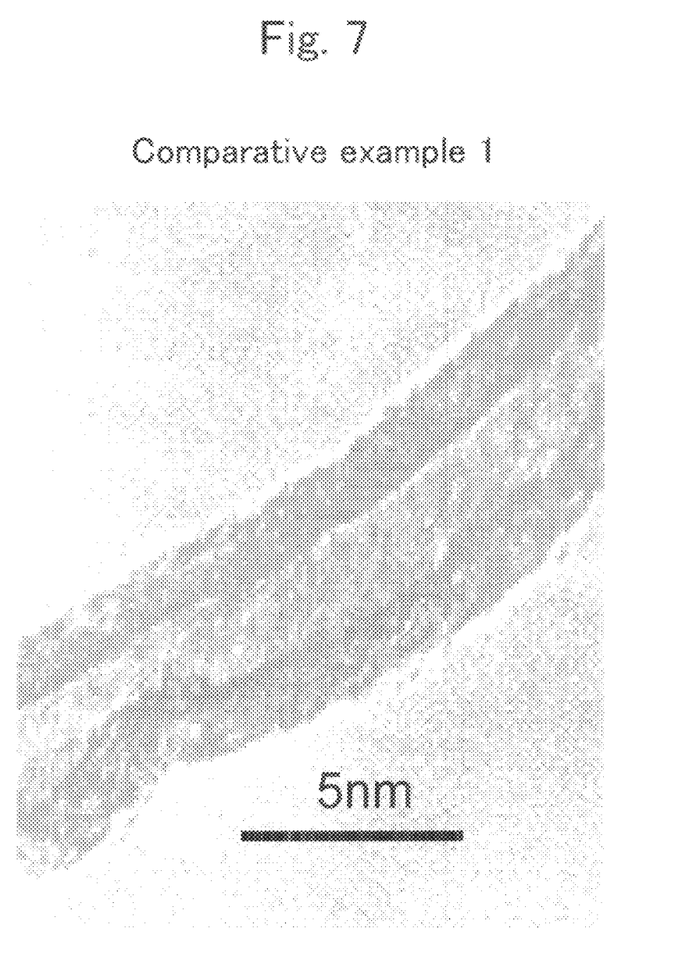
FIG. 7 is a transmission electron microscope (TEM) photograph showing a single carbon nanotube according to a comparative example 1.

The description of the definition of ($I_D/I_G$) will be added. In the carbon nanotube, the greater the number of defects (a portions where carbon-carbon bonding is disconnected in a six-membered ring array structure) in the graphene sheet (six-membered ring array structure) in which carbons are bonded, the lower the crystallinity of the graphene sheet, that is, the degree of graphitization, and the larger the value of $I_D/I_G$ become. The degree of graphitization was measured based on a laser Raman spectroscopy method (laser Raman spectrometer T-64000 manufactured by HORIBA Jobin Yvon SAS) as follows. Namely, only the aligned carbon nanotube assembly was peeled from the substrate, and the degree of graphitization was measured. When an excitation light source was a monochromic laser beam (514.5 nm) in a macro mode, a spot diameter on a sample surface was 100 µm, and average information was obtained from an entire irradiation region. In the laser Raman spectroscopy method, since a difference (Raman shift) between the frequency of Raman scattering light and the frequency of incident light has a value specific to the structure of matter, a Raman effect is utilized as a nondestructive analysis method used for understanding molecular structure and state as in an infrared spectroscopy. In a Raman spectrum in the laser Raman spectroscopy method (horizontal axis: wavelength, vertical axis: intensity of scattering light), a peak structure of the scattering light near 1350 $cm^{-1}$ is referred to as D (defect)-band. The peak structure of the scattering light near 1580 $cm^{-1}$ is referred to as G (graphite)-band. The degree of graphitization in the graphene sheet in which the six-membered carbon ring array structures are continued can be judged based on the $I_D/I_G$ ratio that is a ratio between the intensity of the scattering light in the D-band and the intensity of the scattering light in the G-band. The smaller the $I_D/I_G$ ratio, the more the crystallization has advanced. The larger the $I_D/I_G$ ratio, the less the crystallization has advanced, and lower the crystallinity of the graphene sheet becomes. The $I_D/I_G$ ratio of the Raman spectrum was 1.03 in the carbon nanotube according to the example 1. Meanwhile, the $I_D/I_G$ ratio of the Raman spectrum was 0.09 in the carbon nanotube according to the comparative example 1. FIG. 7 shows a TEM photograph of a single carbon nanotube according to the comparative example 1. As shown in FIG. 7, no pore is formed on the side surface of the carbon nanotube according to the comparative example 1. Meanwhile, according to the carbon nanotube according to the example 1, as shown in FIG. 3, many defective pores as defects are formed on the side surface of the carbon nanotube.

Figure 6:
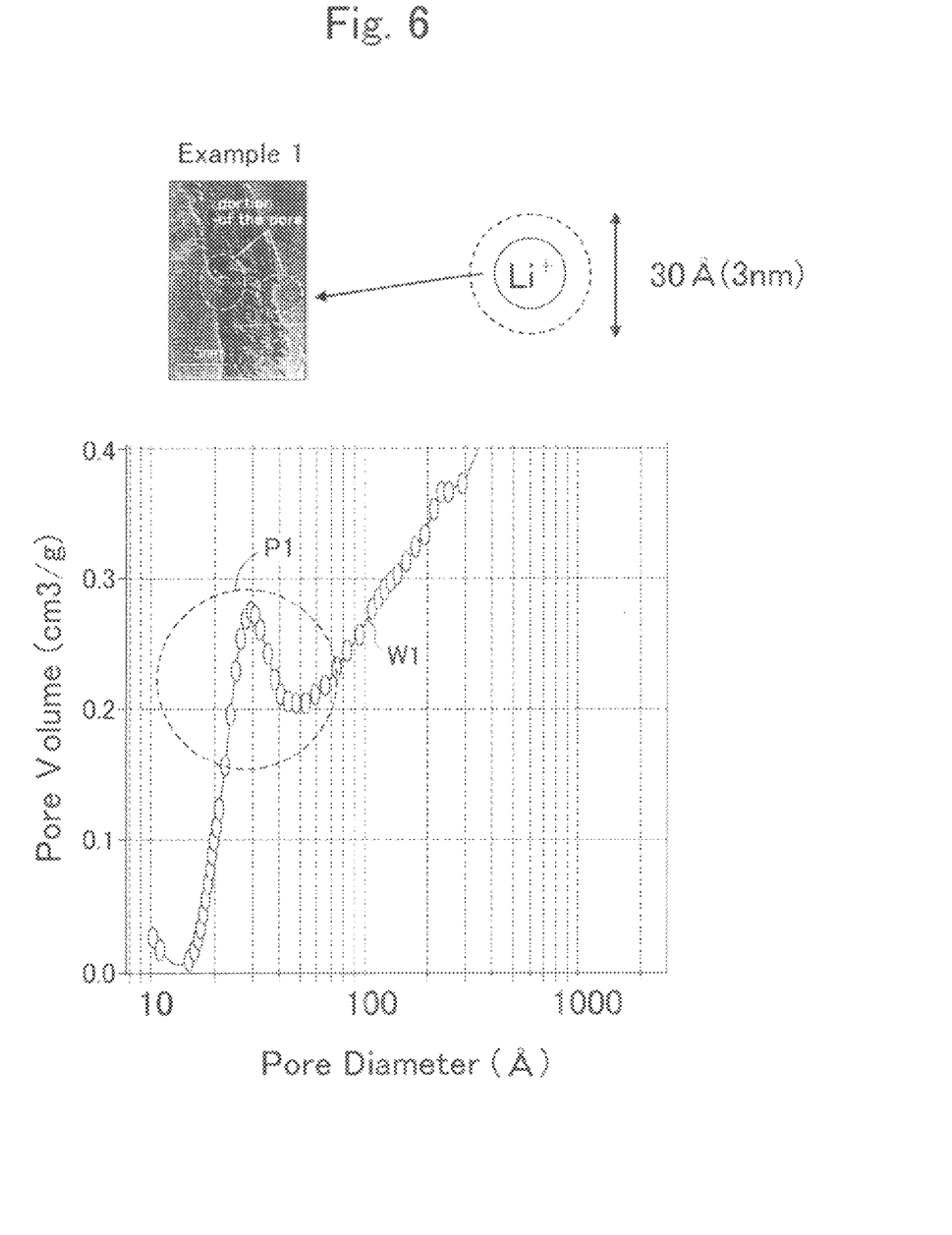
FIG. 6 is a graph showing pore distribution of the aligned carbon nanotube assembly according to the example 1.

FIG. 6 shows pore distribution (nitrogen gas adsorption method) of the aligned carbon nanotube assembly according to the example 1. As a pore distribution measuring apparatus, ASAP-2010N2 manufactured by Shimadzu Corporation was used. The horizontal axis of FIG. 6 shows a pore diameter (angstrom, 1 angstrom=0.1 nm), and the vertical axis shows a pore volume ($cm^3/g$). A characteristic line W1 shows the pore volume. As shown in the characteristic line W1, a peak P1 occurs near 30 angstroms (3 nm). Based on the TEM observation, the peak P1 is considered as a portion of the pore formed on the side surface of the carbon nanotube. Another peak occurs near 400 to 700 angstroms (40 to 70 nm). Based on the TEM observation, this peak is considered as a space between the carbon nanotubes adjacent to each other. Here, a lithium ion does not exist alone in an electrolytic solution but exists in a solvation state in which a solvent is adhered to the lithium ion, and it is considered that the lithium ion moves with the solvent in the solvation state. In this case, it is assumed that a diameter of a lithium solvent particle in the solvation state is 30 angstroms (3 nm). Thus, the lithium solvent particle in such a state that a solvent is adhered to a lithium ion is expected to get in and out of a central hole of the carbon nanotube.

Figure 8:
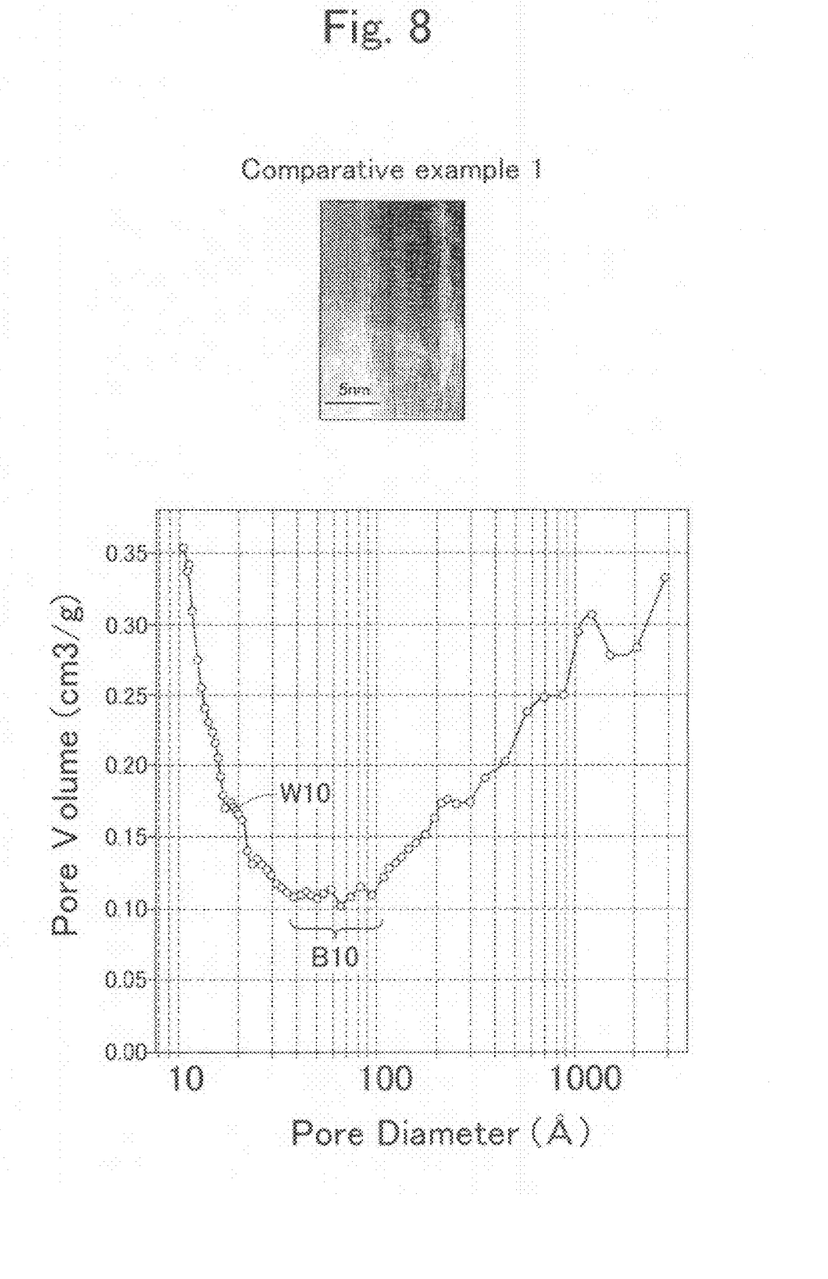
FIG. 8 is a graph showing the pore distribution of the aligned carbon nanotube assembly according to the comparative example 1.

FIG. 8 shows the pore distribution of the aligned carbon nanotube assembly according to the comparative example 1. The horizontal axis of FIG. 8 shows the pore diameter (angstrom, 1 angstrom=0.1 nm), and the vertical axis shows the pore volume ($cm^3/g$). A characteristic line W10 shows the pore volume. As shown in the characteristic line W10, no peak occurs near 30 angstroms (3 nm), but a bottom region B10 occurs. The pore distribution according to the comparative example 1 shown in FIG. 8 supports the suggestion that no pore is formed on the side surface of the carbon nanotube of the comparative example 1.

Example 2

Figure 9:
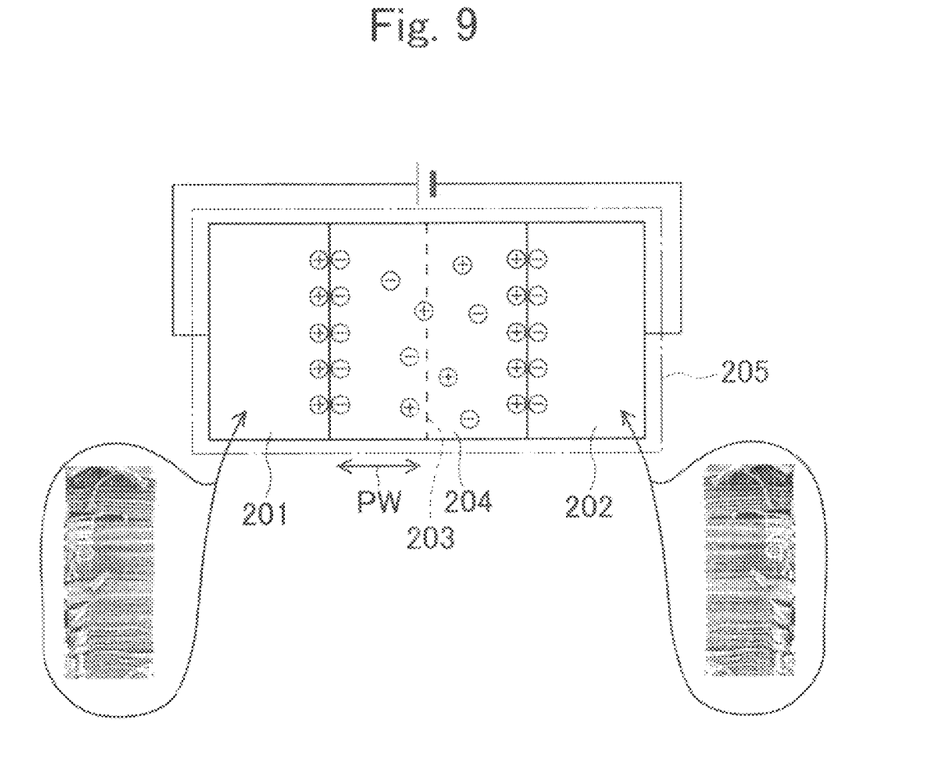
FIG. 9 is a view schematically showing a capacitor according to an example 2.

A lithium ion capacitor (hereinafter also referred to as LIC) is fabricated using an aligned carbon nanotube assembly manufactured based on the example 1. As schematically shown in FIG. 9, the lithium ion capacitor (LIC) has a positive electrode 201 having a positive electrode material formed of activated carbon functioning as a carbon material, a negative electrode 202 formed of a negative electrode material constituted of the aligned carbon nanotube assembly according to the example 1 ($I_D/I_G$=1.03, density: 520 mg/$cm^3$), a separator 203 disposed between the positive electrode 201 and the negative electrode 202, an electrolytic solution 204 disposed between the positive electrode 201 and the negative electrode 202, and a container 205 storing these components. Lithium ions are doped into the negative electrode material forming the negative electrode 202. The electrolytic solution 204 can be prepared by dissolving lithium salt in a non-aqueous organic solvent. Examples of lithium salt include lithium perchlorate, lithium hexafluorophosphate, lithium borofluoride, and lithium trifluoromethanesulfonate. Examples of the solvent include cyclic carbonic acid ester (EC, PC, BC), chain carbonic acid ester (DMC, EMC, DEC), and cyclic ether (THF,DOXL). The separator 203 has ion permeability and prevents electrical short circuit between the positive electrode 201 and the negative electrode 202, and a porous textile and a non-textile may be employed. The aligned carbon nanotube assembly constituting the negative electrode material of the negative electrode 202 according to this example has a high density and a large specific surface area and is porous, and therefore, when the aligned carbon nanotube assembly is used in the negative electrode 202, a power collection capacity can be expected to be increased, and the capacity of the capacitor can be enhanced.

As seen in FIG. 9, it is preferable that the carbon nanotubes are aligned so that the length direction of the carbon nanotube extends along a virtual line PW connecting the negative electrode 202 and the positive electrode 201. In this case, the electrolytic solution stored in the capacitor easily flows along the length direction of the carbon nanotube.

Accordingly, it is expected that positive ions and negative ions easily move along the carbon nanotubes. However, depending on the situation, the carbon nanotubes may be aligned so that the length directions of the carbon nanotubes intersect with each other along the virtual line PW connecting the negative electrode 202 and the positive electrode 201. Since the aligned carbon nanotube assembly has a high density, an output density (low resistance) and a capacity density (high surface area) of a capacitor can be enhanced. The defective pore is frequently formed on the side surface of the carbon nanotube forming the aligned carbon nanotube assembly forming the negative electrode 202. Thus, the uptake amount of lithium ions can be expected to be increased with respect to the carbon nanotube, and lithium ions can be expected to be taken in and out from the inside of the carbon nanotube. The increase of the capacity of the lithium ion capacitor which is a power storage device can be realized.

Example 3

A electric double layer capacitor (EDLC) was fabricated using the aligned carbon nanotube assembly manufactured based on the example 1. The electric double layer capacitor (EDLC) is shown by applying FIG. 9. As schematically shown in FIG. 9, the electric double layer capacitor has a positive electrode 201 having a positive electrode material formed of activated carbon functioning as a carbon material, a negative electrode 202 formed of a negative electrode material constituted of the aligned carbon nanotube assembly according to the example 1 ($I_D/I_G$=1.03, density: 520 mg/cm$^3$), a separator 203 disposed between the positive electrode 201 and the negative electrode 202, an electrolytic solution 204 disposed between the positive electrode 201 and the negative electrode 202, and a container 205 storing these components. No lithium-metal ion is doped in the negative electrode material forming the negative electrode 202. The aligned carbon nanotube assembly according to this example has a high density and a large specific surface area and is porous, and therefore, when the aligned carbon nanotube assembly is used in the negative electrode 202, the power collection capacity can be expected to be increased, and the capacity of the capacitor can be enhanced. It is preferable that the carbon nanotubes are aligned so that the length direction of the carbon nanotube extends along a virtual line PW connecting the negative electrode 202 and the positive electrode 201. In this case, the electrolytic solution stored in the capacitor easily flows along the length direction of the carbon nanotube. Accordingly, it is expected that positive ions and negative ions easily move along the carbon nanotubes. Since the aligned carbon nanotube assembly has a high density, an output density (low resistance) and a capacity density (high surface area) of a capacitor can be enhanced. Furthermore, the defective pore is frequently formed on the side surface of the carbon nanotube forming the aligned carbon nanotube assembly forming the negative electrode 202. Thus, the uptake amount of ions can be expected to be increased with respect to the carbon nanotube. Moreover, although depending on the size of the pore, ions can be expected to be taken in and out from the inside of the carbon nanotube. Although the density of the aligned carbon nanotube assembly is 520 mg/cm$^3$ in this example, it may be not less than 200 mg/cm$^3$ or not less than 300 mg/cm$^3$. Although the positive electrode material is formed of activated carbon in this example, it is not limited thereto, and the positive electrode material may be constituted of the aligned carbon nanotube assembly depending on the situation.

(Test Example LIC)

In a test example LIC according to the present invention, a lithium ion capacitor (LIC) according to the example 2 provided with the aligned carbon nanotube assembly ($I_D/I_G$=1.03, density: 520 mg/cm$^3$) according to the example 1 as a negative electrode was fabricated. First, a circular positive electrode material (produced by Hosen Corp.) having a diameter of 15.5 mm, a circular negative electrode material constituted of an aligned carbon nanotube assembly, and a circular separator (formed of cellulose, commodity name: TF40 produced by Nippon Kodoshi Corporation) were prepared. Those components were incorporated in a bipolar container (commodity name: HS cell produced by Hosen Corp.) under an environment at a dew point of not more than −30° C., whereby the lithium ion capacitor (LIC) was formed as a power storage device. Concerning the electrolytic solution, a cell container was previously evacuated at a degree of vacuum of 1 MPa, then the pressure was immediately returned to atmospheric pressure, and the electrolytic solution was made to penetrate in the positive electrode material, the negative electrode material, and the separator. In the electrolytic solution, the electrolyte was lithium hexafluorophosphate (LiPF$_6$) as lithium salt. The solvent was a non-aqueous mixed solvent composed of ethylene carbonate (EC) and diethyl carbonate (DEC) (EC: DEC=1:1 v/v %). The concentration was 1 mol/L. For the discharge current of the lithium ion capacitor (LIC), the capacitance was obtained by a battery charging and discharging device (HJ-201B manufactured by Hokuto Denko Corp.) based on the inclination of a tangent line from 3.4 to 2.4 V of a voltage-capacity curve at the time of discharging under such a condition that the charging voltage was 3.8 V, the charging current was 0.96 mA, the charging time was 30 minutes, and the discharging current was 0.96 mA. A value in the third cycle was collected as data.

(Test Example EDLC)

In the test example EDLC according to the present invention, an electric double layer capacitor (EDLC) provided with the aligned carbon nanotube assembly ($I_D/I_G$=1.03, density: 520 mg/cm$^3$) according to the example 1 as a negative electrode was fabricated. The major structure of the electric double layer capacitor (EDLC) is basically similar to that shown in FIG. 9. The test example EDLC has a coin shape and has a positive electrode material formed of activated carbon (specific surface area: 2100 m$^2$/g), a separator, a negative electrode material constituted of the aligned carbon nanotube assembly according to the example 1, an electrolytic solution, and a container storing these component. In this case, a circular positive electrode material (produced by Hosen Corp.) having a diameter of 15.5 mm, a circular negative electrode material constituted of an aligned carbon nanotube assembly, and a circular separator (formed of cellulose, commodity name: TF40 produced by Nippon Kodoshi Corporation) were provided. Those components are incorporated in a bipolar container (commodity name: HS cell manufactured by Hosen Corp.) under an environment at a dew point of not more than −30° C., whereby the electric double layer capacitor (EDLC) was formed as a power storage device. In this case, concerning the electrolytic solution, a cell container was previously evacuated at a degree of vacuum of 1 MPa, then the pressure was immediately returned to atmospheric pressure, and the electrolytic solution was made to penetrate in the positive electrode material, the negative electrode material, and the separator.

The electrolytic solution was a Ca electrolytic solution. Since Ca is divalent alkaline earth metal, an electrical energy can be expected to be increased. In the Ca electrolytic solution, two electrons per one atom of calcium are involved in a reaction. Namely, in a reaction of 1 mol atom of calcium, two mol electrons (quantity of electricity of 2 faradays) take part in the reaction, and the electrical energy that can be extracted from a capacitor can be expected to be increased. As a process for producing the Ca electrolytic solution, the Ca electrolytic solution was prepared as follows. As a starting material, a solvent was cyclic ester (γ-butyrolactone (GBL)), and an electrolyte was calcium perchlorate ($Ca(ClO_4)_2$). Concerning a mixing procedure and a blending quantity, 4.35 g of magnesium perchlorate ($Ca(ClO_4)_2$ produced by Kishida Chemical Co., Ltd.) was dissolved in 28 ml of cyclic ester (γ-butyrolactone (GBL) produced by Kishida Chemical Co., Ltd.) and then stirred for one day at room temperature to be prepared. The discharge current was calculated by a battery charging and discharging device (HJ-201B manufactured by Hokuto Denko Corp.) from the inclination of a tangent line from 2.5 to 1.0 V of a voltage-capacity curve at the time of discharging under such a condition that the charging voltage was 2.5 V, the charging current was 0.24 mA, the charging time was 30 minutes, and the discharging current was 0.24 mA. A value in the third cycle was collected as data.

(Weight Energy Density)

(i) Concerning a lithium ion capacitor according to the test example LIC and an electric double layer capacitor according to the test example EDLC, the discharge current test was conducted as described above, and the weight energy density was calculated based on an actual measurement value of a discharge current. The weight energy density means energy per unit weight of a power storage device. The weight energy density in the lithium ion capacitor was obtained based on the following calculation formula A. * is a symbol of multiplication.

In a lithium ion capacitor according to a comparative example A, the energy density was 0.92 Wh/Kg, and it was low. The lithium ion capacitor according to the comparative example A was basically produced to have the same structure and material as the lithium ion capacitor according to the test example LIC. However, not the aligned carbon nanotube assembly according to the example 1 but the aligned carbon nanotube assembly according to the comparative example 1 ($I_D/I_G$=0.09, density: 180 mg/cm$^3$) was used as the negative electrode material. Meanwhile, in the aligned carbon nanotube assembly according to the test example LIC, the weight energy density was 4.76 Wh/Kg, and it was about five times (4.76/0.92≈5.17) that in the lithium ion capacitor according to the comparative example A.

The calculation formula A . . . Energy density (Wh/Kg)=[(real upper limit voltage+lower limit voltage)/2]*Ah/Kg, where Ah means the total amount of discharge current. Kg means the weight (unit: kg) of the capacitor.

Test Example LIC:

[(3.7982+2.2076)/2]*0.0001/0.000062968=4.76 Wh/Kg

Comparative Example A

[(3.6294+2.2031)/2]*0.00002/0.000063248=0.92 Wh/Kg (ii) Concerning an electric double layer capacitor according to the test example EDLC, the discharge current test was conducted, and the energy density was calculated based on an actual measurement value of a discharge current. The weight energy density was obtained based on the following calculation formula B. The same holds for an electric double layer capacitor according to a comparative example B. The electric double layer capacitor according to the comparative example B was produced to have the same structure and material as the capacitor according to the test example EDLC. However, not the aligned carbon nanotube assembly according to the example 1 but the aligned carbon nanotube assembly according to the comparative example 1 ($I_D/I_G$=0.09, density: 180 mg/cm$^3$) was used as the negative electrode material. The energy density of the electric double layer capacitor according to the comparative example B was 0.81 Wh/Kg, and it was low.

Meanwhile, in the electric double layer capacitor according to the test example EDLC corresponding to the invented product, the weight energy density was 2.30 Wh/Kg, and it was about 2.8 times (2.30/0.81≈2.84) the electric double layer capacitor according to the comparative example B.

Calculation Formula B:

Weight energy density (Wh/Kg)=[real upper limit voltage/2]*Ah/Kg,

Example B

[2.2755/2]*0.00013/0.000064388=2.30 W/Kg

Comparative Example B

[2.0609)/2]*0.00005/0.000063848=0.81 Wh/Kg

The description of the weight energy density will be added. In a case where a power storage device is discharged with a constant output value W (watt), when the discharge duration time is represented as h (hour), the energy amount E that can be taken out at this time is represented as E=W×h. Since those values are different depending on the size of a power storage device, a figure obtained by dividing each value by a weight of a power storage device (including a weight of a cell container) for the purpose of standardizing and comparing the capability is referred to as the weight energy density.

(Other)

According to the above example 1, although the iron-titanium alloy is used as the catalyst, the catalyst is not limited thereto, cobalt-titanium alloys, cobalt-vanadium alloys, nickel-titanium alloys, nickel-vanadium alloys, iron-zirconium alloys, and iron-niobium alloys may be used. According to the example 1, although the substrate is heated at 650° C., the temperature may be 600° C. or 630° C. According to the examples 2 and 3, in the aligned carbon nanotube assembly, the density is not less than 200 mg/cm$^3$, not less than 300 mg/cm$^3$, not less than 400 mg/cm$^3$, or not less than 600 mg/cm$^3$, and the density of the number of the carbon nanotubes can be enhanced. Moreover, the $I_D/I_G$ ratio may be within a range from 0.80 to 1.20, a range from 0.90 to 1.10, or a range from 1.00 to 1.10. The present invention is not limited only to the above examples and test examples and can be modified and embodied within a range which does not deviate from the gist of the invention.

The following technical matters are grasped from the present specification.

[Supplementary information 1] The present invention provides a carbon nanotube characterized by comprising a defective pore on a side surface of a carbon nanotube. The $I_D/I_G$ ratio of the carbon nanotube is preferably not less than 0.80. The density of the carbon nanotube is preferably not less than 100 mg/cm$^3$.

[Supplementary information 2] The present invention provides an aligned carbon nanotube assembly in which a large number of carbon nanotubes aligned in parallel along the same direction and having parallel orientation are aggregated. In the aligned carbon nanotube assembly, in such a state that the aligned carbon nanotube assembly remains grown, the carbon nanotube constituting the aligned carbon nanotube assembly has a defective pore on its side surface. The $I_D/I_G$ ratio of the aligned carbon nanotube assembly is preferably not less than 0.80. The density of the aligned carbon nanotube assembly is preferably not less than 100 mg/cm$^3$.

[Supplementary information 3] The present invention provides a carbon-based electrode constituted of an aligned carbon nanotube assembly in which a large number of carbon nanotubes aligned in parallel along the same direction and having parallel orientation are aggregated. In the carbon-based electrode, in such a state that the aligned carbon nanotube assembly remains grown, the carbon nanotube constituting the aligned carbon nanotube assembly has a defective pore on its side surface. The $I_D/I_G$ ratio of the aligned carbon nanotube assembly is preferably not less than 0.80. The density is preferably not less than 100 mg/cm$^3$.

[Supplementary information 4] The present invention provides a power storage device provided with a positive electrode, a negative electrode, an electrolytic substance interposed between the positive electrode and the negative electrode, a separator disposed between the positive electrode and the negative electrode, transporting the electrolytic substance, and suppressing electrical short circuit between the positive electrode and the negative electrode, and a container storing the positive electrode, the negative electrode, the electrolytic substance, and the separator. In this power storage device, at least one of the positive electrode and the negative electrode is provided with the carbon nanotubes according to supplementary informations 1 and 2.

INDUSTRIAL APPLICABILITY

The aligned carbon nanotube assembly according to the present invention can be utilized for a carbon material required to have a large specific surface area, a large current collecting property, and a large electroconductivity. For example, the aligned carbon nanotube assembly can be utilized in, for example, a carbon material used in various batteries such as a capacitor, a secondary battery, a wet solar cell, and a fuel battery.

DESCRIPTION OF REFERENCE SYMBOLS

201: Positive electrode, 202: Negative electrode, 203: Separator, 204: Electrolytic solution, 205: Container

The invention claimed is:

1. A power storage device comprising:
a positive electrode;
a negative electrode;
an electrolytic substance interposed between the positive electrode and the negative electrode;
a separator disposed between the positive electrode and the negative electrode, transporting the electrolytic substance, and suppressing electrical short circuit between the positive electrode and the negative electrode; and
a container storing the positive electrode, the negative electrode, the electrolytic substance, and the separator,
wherein at least one of the negative electrode and the positive electrode comprises an aligned carbon nanotube assembly in which a plurality of carbon nanotubes aligned in parallel along the same direction and having parallel orientation are aggregated, and
wherein for the aligned carbon nanotube assembly as grown,
1) the carbon nanotube comprising the aligned carbon nanotube assembly has a defective pore on its side surface, and
2) in a raman spectrum of the aligned carbon nanotube assembly in a Raman spectrometric method, when intensity of scattered light in D-band is represented by $I_D$ and intensity of scattered light in G-band is represented by $I_G$, an $I_D/I_G$ ratio is not less than 0.80.

2. The power storage device according to claim 1 being a lithium ion capacitor having an electrolytic substance containing Li ions.

3. The power storage device according to claim 1 being an electric double layer capacitor having an electrolytic substance containing Ca ions.

4. The power storage device according to claim 1, wherein at least one of the negative electrode and the positive electrode comprises an aligned carbon nanotube assembly whose density is not less than 100 mg/cm$^3$.

* * * * *